Patented May 30, 1939

2,160,500

UNITED STATES PATENT OFFICE 2,160,500

METHOD OF RECOVERING METALS AND PAPER

Ludwig Halberstadt, Halle, Germany

No Drawing. Application September 23, 1936, Serial No. 102,175. In Germany September 27, 1935

1 Claim. (Cl. 92—9)

This invention relates to the problem of recovering the paper as well as the aluminum in paper which is covered with adhering aluminum. By the disclosed method aluminum salts or other compounds produced by means of aluminum may also be obtained.

Heretofore paper covered with aluminum foil has been burned to partially recover the metal. When thus used, paper covered with aluminum foil has been regarded merely as scrap which possessed little or no market value.

It has been known to recover aluminum by a process using chlorine gas, and also by other chemical processes. These processes were unavailable because the paper was destroyed, so that the economy of the processes was impaired.

It was also proposed to put the aluminum covered waste paper through a sand filter after reducing the waste by a process of dissolving, cutting and grinding, in which the metal particles would sink to the bottom for final separation. This process was very costly and resulted in destruction of the paper.

This invention provides methods of recovering both the paper and the aluminum by the use of dilute acid solutions which would otherwise be substantially inert to the aluminum, but these solutions having activating agents for the aluminum to cause the latter to be dissolved without causing destruction of the paper or the fibers thereof, because of the dilution of the solutions.

The activating agent may be platinum, mercury, copper, tin, antimony, and the like or their salts. Salts of aluminum, may also serve as activating agents. The activating agents appear to work best when highly diluted. They cause corrosion of the aluminum foil, and hence cause it to be rapidly dissolved, a result which would not otherwise be obtained because of the high degree of purity of aluminum foil.

By removing the freed paper from the solution in which the aluminum has been dissolved, and adding an additional quantity of aluminum covered paper to the solution, a higher concentration is obtained.

It is possible to use solutions as of organic acids, which will yield valuable salts or other compounds, as by reaction with the aluminum, or by catalytic change, to provide by products for the process. If a compound so results which is non soluble, it is desirable to agitate the solution to prevent such compound from settling on the aluminum. No heat need be applied in the practise of the process.

Example 1

A mass of 280 grams of paper with aluminum foil adhering thereto is placed in 2.1 liters of a 4% solution of 55 grams of hydrochloric acid. After adding 2 grams of mercuric chloride (sublimate) in the form of a 1% solution, a violent reaction occurs. After 4 hours, the aluminum has become dissolved, and the paper and solution are both clear. The solution contains more than 2 grams of hydrochloric acid.

Example 2

A mass is taken of 520 grams of paper covered with aluminum foil, of which the latter represents about 10%. This mass is placed in 460 c. c. of 80% acetic acid to which is added 7 grams of mercuric chloride (Hg Cl₂). Violent generation of hydrogen occurs, the reaction being completed after about 2 hours. The paper may then be removed. The mercury can be recovered as metallic mercury at the bottom of the vat. Any mercury which may have deposited on the paper, may be separated therefrom by settling or filtration. The remaining colorless solution contains about 12% of aluminum acetate, and is so pure as to be highly stable. This solution may be changed into basic aluminum acetate in a well known manner. If desired, some additional aluminum covered paper may be added near the close of the reaction for a new cycle of the process.

Example 3

A mass of 14 grams of paper covered with aluminum foil is placed in 210 grams of benzol containing some mercuric chloride. Then about 25 grams of benzyl chloride (C₆H₅.CH₂Cl) is gradually added. A good deal of hydrochloric acid gas goes off, and the solution turns yellowish brown. After one hour, the process is complete. A by-product di phenyl methane (C₆H₅)2CH₂ is obtained by decomposing with water, drying and distilling.

I claim:

A process of recovering both paper and aluminum from waste material comprising paper having adherent aluminum foil thereon, including treating the waste material with acetic acid as reagent in the presence of mercuric chloride as activating agent for the aluminum to cause the same to be dissolved by the reagent, the reagent and activating agent being so diluted as to cause the chemical structure of the paper to be substantially maintained, and the reagent being substantially incapable of dissolving the aluminum independently of the activating agent, and finally removing the aluminum compound produced.

LUDWIG HALBERSTADT.